April 5, 1955   J. P. SPALDING ET AL   2,705,391
TOOL SHARPENING DEVICE
Filed July 24, 1950   2 Sheets-Sheet 1
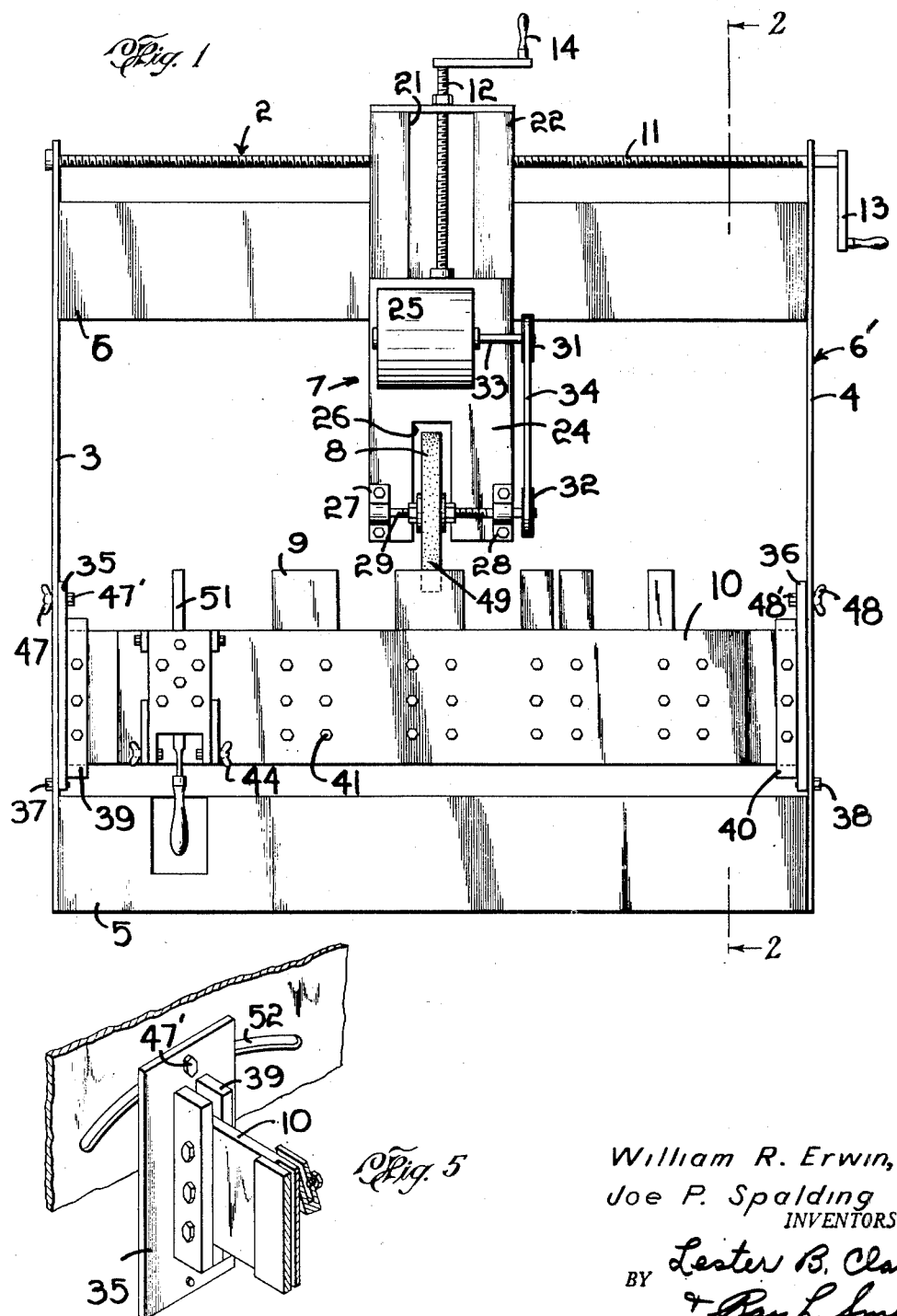
William R. Erwin, Jr.
Joe P. Spalding
   INVENTORS
BY Lester B. Clark
   Ray L. Smith
   ATTORNEYS April 5, 1955

J. P. SPALDING ET AL 2,705,391

TOOL SHARPENING DEVICE

Filed July 24, 1950

William R. Erwin, Jr.
Joe P. Spalding
INVENTORS

BY Lester B. Clark
Ray L. Smith

ATTORNEYS

2,705,391

TOOL SHARPENING DEVICE

Joe P. Spalding and William R. Erwin, Jr., Denton, Tex.

Application July 24, 1950, Serial No. 175,562

2 Claims. (Cl. 51—34)

The invention relates to a tool grinder and more particularly relates to a grinder which is adapted to grind or sharpen a plurality of tools with one setting at any desired bevel.

An object of the instant invention is to provide in a tool grinder a tool support bar which is pivotally mounted in the grinder so as to support tools which are to be ground thereon at any preselected angle.

Another object of the invention is to provide in a tool grinder a tiltable tool support bar and a grinder assembly with a grinder mounted thereon to engage tools supported in the support bar.

Another object of the invention is to provide in a tool grinder a tiltable tool support bar and a grinder assembly with a grinder mounted thereon adapted to engage tools supported in the support bar, said tool support bar being adapted to be set at selected positions whereby the grinder on the grinder assembly may contact the tools supported thereon to bevel or grind them at predetermined angles.

Another object of the invention is to provide in a tool grinder a grinder assembly movably secured on a vertical and horizontal feed screw, whereby such assembly may be moved relative to a tiltable support bar in the grinder to contact the plurality of tools to be sharpened which are mounted on such bar.

Another object of the invention is to provide a tool grinder comprising a frame, tiltable brackets mounted thereon, a tool support bar mounted on said brackets, a grinder assembly on said frame, a horizontal and vertical feed shaft engaged with said grinder assembly to move said assembly vertically and horizontally in said frame, a grinder rotatably mounted on said assembly and clamp means to retain said tool support at selected tilt positions, whereby said grinder can be moved longitudinally of said tool support bar to grind supported tools to a desired angle.

Other and further objects and advantages of the invention will become more readily apparent from a consideration of the following description and drawings wherein:

Fig. 1 is a vertical elevational view showing the preferred embodiment of the invention;

Fig. 5 is an enlarged perspective view illustrating the tiltable support brackets and support bar, forming a part of the construction.

Figure 3:
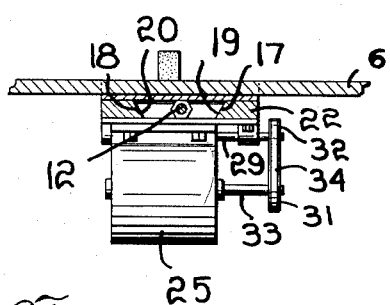
Fig. 3 is a horizontal section on the line 3—3 of Fig. 2, and illustrates a detail of connection between the vertical feed bar and the grinder assembly.

In Fig. 1 the device is generally denominated by the numeral 2, and is shown as comprising the vertical uprights 3 and 4 retained in spaced relation by the cross bars 5 and 6. This construction generally represents the frame 6' of the device. It seems obvious, of course, that any suitable number of vertical spaced uprights and cross bars could be provided without departing from the scope of the invention.

The grinder assembly, denoted generally by the number 7, is mounted for horizontal and vertical movement within the frame 6' between the vertical uprights 3 and 4. Such assembly is provided with a grinder 8, adapted to engage tools 9 mounted in the support bar 10 extending between the spaced uprights 3 and 4.

Also connected with the grinder assembly 7 is the horizontal feed shaft 11, and vertical feed shaft 12, which serve to move the grinder assembly 7 to various vertical and horizontal positions within the frame 6'. Cranks 13 and 14 are provided respectively on the horizontal and vertical feed shafts, whereby they may be rotated to impart movement to the grinder assembly 7. Any suitable connection may be provided between the feed shaft 11 and the grinder assembly 7, with one form being illustrated in the drawings wherein a plate 15 is provided on the back side of the grinding assembly to engage the feed shaft 11 and the cross bar 6. The plate 15 is provided with tapers 17 and 18 which fit the tapers 19 and 20 along the edges of the cross bar 6. This forms a dovetail connection between the cross bar 6 and plate 15 which serves to position the grinding assembly with respect to the cross bar 6, but also allows relative movement therebetween. An opening 21 is provided in the vertically extending plate 22 to which the plate 15 is affixed, this opening also having tapered side portions 17 and 18 to fit the tapers 19 and 20 on the block 23, which is secured to the plate 24 and movable along vertical feed shaft 12. This provides a dovetail connection between the plate 22 and the block 23 and allows vertical movement of the plate 24 and the mechanism supported thereon.

The plate 24 has mounted thereupon a motor, or other suitable power means 25. A slot 26 is provided to receive the grinder 8 in the plate 24. The grinder may be rotatably mounted upon the plate in any suitable manner, and is shown as having a shaft 29 mounted in the brackets 27 and 28, which may be provided with suitable bearings to support the shaft. Pulleys 31 and 32 of the motor shaft 33 and grinder shaft 29 respectively transmit power through the belt 34 to the grinder from the motor.

Mounted on the spaced uprights 3 and 4 are the brackets 35 and 36. These brackets are pivotally mounted upon the uprights in any suitable manner, and are shown as being mounted by means of the screws 37 and 38 respectively. The brackets 35 and 36 are provided with extending lugs or ears 39 and 40 arranged to receive the support 10. The support bar may be of any suitable configuration, and is shown as being provided with slots 40' to receive the tools 9 therein. Clamp means such as the screws 41 are provided on the support bar to bear against the surfaces of the tools 9 to retain them in the proper position in the slots 40' and on the support bar.

A forwardly extending arcuate trackway 42 may be provided on the support bar 10 to receive the auxiliary support 10' which is pivotally mounted at 43 on the support bar 10. Wing nut 44 may be engaged through the trackway and into the side of the auxiliary support 10' to position it at various angular positions in the trackway 42. This permits an additional adjustment position for tools on the support bar 10.

Wing nuts 47 and 48 may be engaged with screws 47' and 48' extending from brackets 35 and 36 respectfully and through the curved slot 52 in the vertical uprights whereby such brackets may be positioned at predetermined tilted positions to retain the support bar 10 and supported tools 9 at an angle with respect to the cutting face 49 of the grinder 8.

While it is believed that the operation of the invention is apparent by reason of the foregoing, by way of illustration and amplification it will be assumed that a plurality of tools 9, as illustrated in Fig. 1, are positioned in the device to be sharpened.

Figure 2:
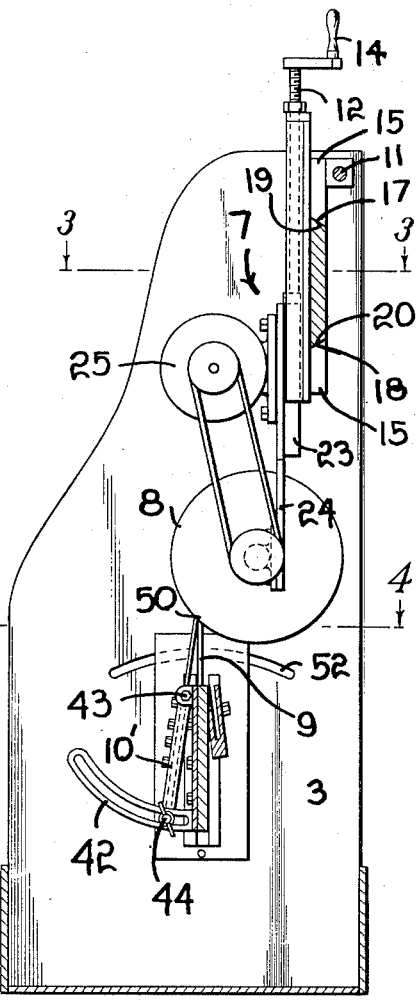
Fig. 2 is a vertical sectional view on the line 2—2 of Fig. 1, and illustrates the details of construction of the invention shown in Fig. 1.
Figure 4:
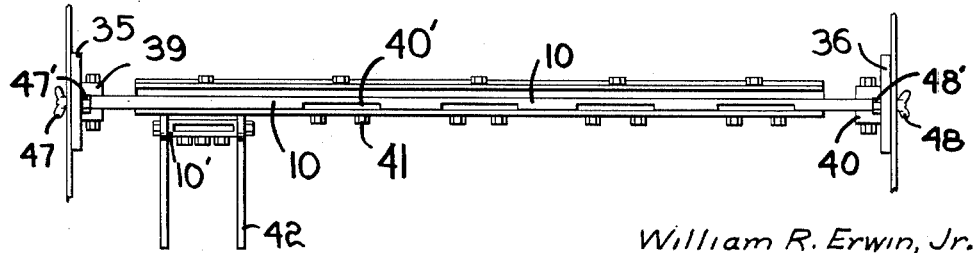
Fig. 4 is a horizontal section on the line 4—4 of Fig. 2 and illustrates a construction of the tool support bar and clamp means to retain the tools in position thereon.

The support bar 10 may then be tilted by adjusting the brackets 35 and 36 to the desired angle, such position to be determined by the angle desired on the edge of the tool as shown at 50 in Fig. 2 on the tool 9. The horizontal feed shaft 11 may then be rotated to move the grinding assembly 7 to one side extremity of the frame 6. The vertical feed shaft 12 is rotated to move such assembly downwardly into contact with the tools 9, whereupon grinding of the tools may be effected. By moving the grinding assembly 7 horizontally from side to side in the frame 6 while the cutting face 49 of the grinder 8 is in contact with the tool being sharpened, it seems obvious that the same degree of cut or sharpening may be applied to a plurality of the tools positioned in the support bar 10, as illustrated in Fig. 1.

In this manner a plurality of the tools may be sharpened in one operation, thereby obtaining the same degree of bevel or cut in all of such tools. If it is desirable to provide additional adjustment or angle to any of the tools 9, other than that furnished by tilting of the support bar 10, such tool may be positioned in the auxiliary support 10' as illustrated in 51. Such auxiliary support may also be designed to carry odd shaped tools, which are provided with handles and the like.

From the foregoing description it can be readily appreciated that a device is provided which quickly and efficiently sharpens a plurality of tools to the same degree of sharpness, or to the same bevel, along the cutting edge thereof.

What is claimed is:

1. A tool grinder, comprising, a support frame having upright spaced apart side members, a work holder extending transversely between said side members, said work holder comprising a generally flat rectangular plate member pivotally connected at its ends to said side members for adjustably positioning the plate member in a plane having a selected angular relation to the vertical, a plurality of laterally spaced work-holding receptacles in said plate member adapted to support work objects in upwardly projecting relation to the upper edge of said plate member, and a grinder assembly positioned on said frame between said side members and above said work holder and movable on the frame both parallel and perpendicularly relative to the upper edge of said plate member, said grinder assembly including a grinding wheel positioned therein with its plane of rotation generally perpendicular to the upper edge of said plate member.

2. A tool grinder, comprising, a support frame having upright spaced apart side members, a work holder extending transversely between said side members, said work holder comprising a generally flat rectangular plate member, a pair of support brackets connected to the ends of said plate member, the ends of said brackets adjacent the lower longitudinal edge of said plate member having pivoted connection to the respective side members, arcuate slots in each of said side members adjacent the opposite ends of said brackets, clamping means projecting from said opposite ends of said brackets through said slots to adjustably position said plate member in a plane having a selected angular relation to the vertical, a plurality of laterally spaced work holding receptacles in said plate member adapted to support work objects in upwardly projecting relation to the upper edge of said plate member, and a grinder assembly positioned on said frame between said side members and movable on the frame both parallel and perpendicularly relative to the upper edge of said plate member, said grinder assembly including a grinding wheel positioned therein with its plane of rotation generally perpendicular to the upper edge of said plate member.

References Cited in the file of this patent

UNITED STATES PATENTS

| 104,584 | Hardy | June 21, 1870 |
| 129,548 | Grant | July 16, 1872 |
| 234,299 | Le Roy | Nov. 9, 1880 |
| 329,289 | Dawes | Oct. 27, 1885 |
| 348,753 | Le Roy | Sept. 7, 1886 |
| 768,493 | Vogel | Aug. 23, 1904 |
| 977,060 | Welker | Nov. 29, 1910 |
| 1,659,257 | Giampeter | Feb. 14, 1928 |
| 1,694,560 | Parish | Dec. 11, 1928 |
| 2,069,097 | Root | Jan. 26, 1937 |
| 2,120,500 | Makaroff | June 14, 1938 |

FOREIGN PATENTS

| 641,553 | France | Apr. 21, 1928 |